W. GREEN.
TIRE PROTECTOR.
APPLICATION FILED AUG. 4, 1908.
927,787.
Patented July 13, 1909.
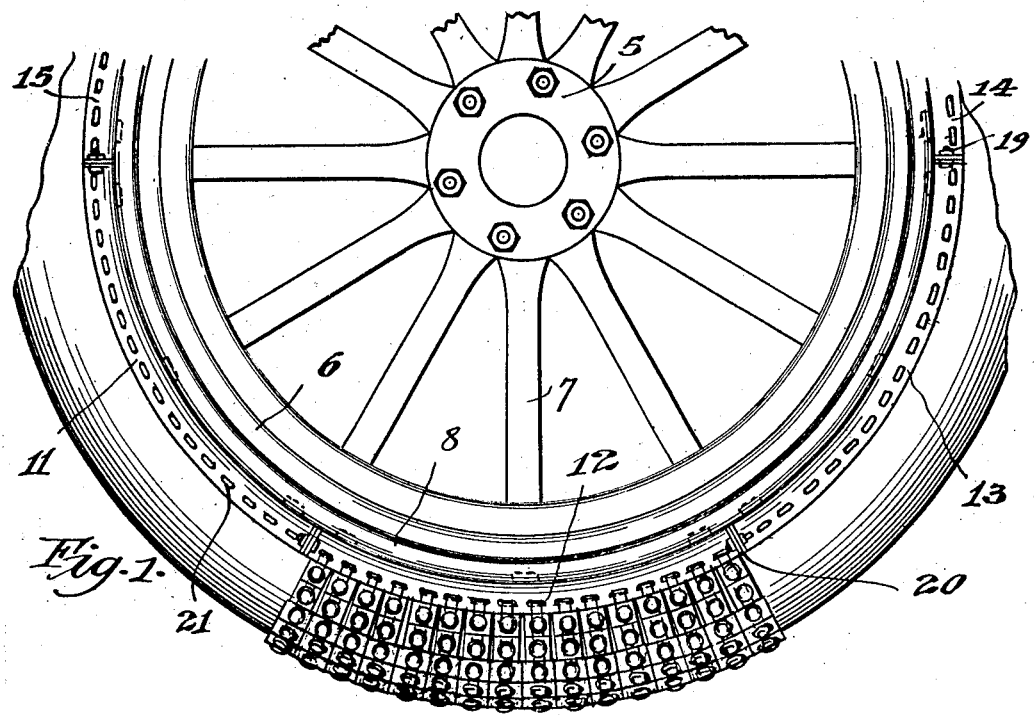
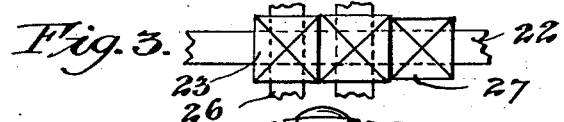
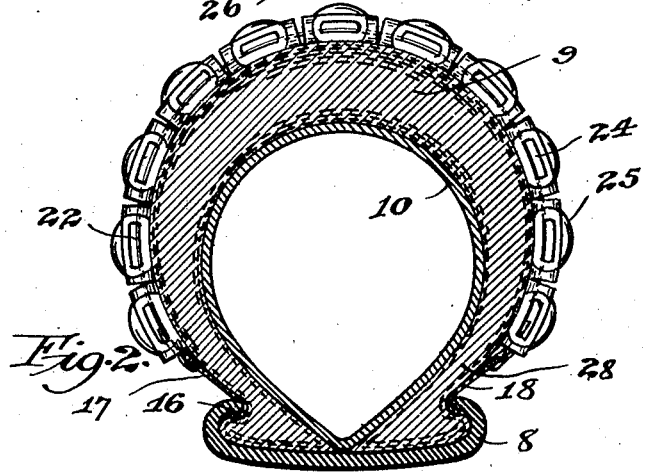
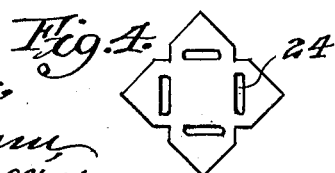
Witnesses,
F. S. Mann
James R. Offield
Inventor,
William Green.
By Offield, Towle & Linthicum
Attys.

UNITED STATES PATENT OFFICE.

WILLIAM GREEN, OF HARVEY, ILLINOIS.

TIRE-PROTECTOR.

No. 927,787.

Specification of Letters Patent.

Patented July 13, 1909.

Application filed August 4, 1908. Serial No. 446,966.

*To all whom it may concern:*

Be it known that I, WILLIAM GREEN, a citizen of the United States, residing at Harvey, in the county of Cook and State of Illinois, have invented certain new and useful Improvements in Tire-Protectors, of which the following is a specification.

The invention relates in general to a protective covering for pneumatic tires, or the like; the objects of the invention being as follows:

The primary object is to provide a pneumatic tire with an armor or outer covering, whereby the tire is rendered practically puncture proof.

A second object is to provide means for preventing the vehicle from skidding, and a third object is to construct an armor or tire protector that can be readily attached or detached, and which will not in any way injure the tire.

One of the many disadvantages of a device of this kind lies in the fact that the protector and tire together destroy a macadam road, or the like, for the reason that a suction is formed by the depression of the tire, which picks up gravel from the road, and the revolution of the wheels or wind tends to throw or blow the gravel away from the place that it was pulled from in the road; depressions are thereby formed in the road, due to the suction and the removing of a portion of the gravel, which soon renders a road practically useless for automobiles or like purposes.

A further object, therefore, of my invention is to prevent a suction or vacuum forming at the point on the tire where the same is in contact with the road bed, and also preventing the tire protector from throwing gravel or the like from the road bed.

The foregoing objects are accomplished by making the tire protector of a series of metallic links through which metal bands or wires pass, said metallic links being hollow to accomplish the objects set forth.

Other advantages of my device will appear throughout the specification, and are shown in the drawing, in which—

Figure 1 is an elevational view of a section of my device applied to a wheel, parts of which are broken away; Fig. 2 is an enlarged detailed section of a pneumatic tire with a section of my device secured thereto; Fig. 3 is a plan view of links or sections, with the securing band running therethrough; Fig. 4 is a plan view of a link in flattened form.

Referring now more particularly to the drawings, 5 represents the hub of a wheel, 6 the felly, 7 the spokes, and 8 the rim, which is of the clencher type, 9 represents the ordinary pneumatic tire of the clencher type with the usual inner tube 10.

The tire protector is preferably made in sections 11, 12, 13, 14 and 15, constituting rim engaging members, the latter two only being partially shown, and it is understood that there may be as many sections as desired. Each of said sections or rim engaging members referred to, may be designated as the rim section, and consists of a metal plate curved along one edge to form a hook 16 adapted to engage the curved edges of the clencher rim, as herein shown. It is understood that each section is composed of two rim sections adjacently disposed on either side of the tire and engaging the rim, two of said sections being shown and designated by 17 and 18.

For the purpose of brevity, only one section and its parts will be described, it being understood that the sections are secured together by means of a bolt and nut 19, which pass through the meeting up-turned ends 20 of said sections. Each section is provided along its outer edge with a series of slots 21, to which metallic bands 22 are secured, the metallic bands being attached to one section such as 17, and passes transversely over the tire and secured to the other section 18 in the registering slot 21.

Slidably mounted upon a metallic wire or band 22 are a series of metallic plates or sections 23, there being a sufficient number of metallic plates on each band or wire to cover the tire between the two edges of the clencher rim, extending transversely over the tire. In the preferred form of construction, each plate or metallic section is preferably square in cross section as shown in Fig. 4, the four corners of which are bent over to meet at a point in substantially the middle of each plate, and all lie in substantially the same plane to present a flat surface to the tire. Apertures or slots 24 are formed in each plate at the bending points of said plate, whereby openings will be formed upon all four edges to permit the bands or wires to pass between the two sides of said plate.

Each plate is preferably formed with a raised portion or button 25 on its outer surface which button portion is adapted to come in contact with the ground, for the purpose of preventing skidding or sliding of the tire. The metallic band or wire 22 passes through two of the adjacent slots in the metallic plates as herein shown, and as before stated the band only extends over the tire transversely, but it is of course obvious that bands could extend through the metallic plates circumferentially of the tire, if so desired, as shown in Fig. 3 by the bands 26.

The rim sections 12 have a series of bands secured therebetween with a series of metallic plates upon said bands whereby the tire is covered with metal plates throughout the entire length of said section 12, and it is of course understood that the remaining rim sections are provided with a series of bands having metallic plates, the same as shown in section 12, whereby the whole tire is covered.

It is of course understood that for the purpose of preventing skidding, or for use upon wet, slippery or sandy road beds, it is not essential that the entire tire be covered, as one or two sections would prevent skidding and assure a proper grip of the tire upon the ground, to a large degree, but the device is preferably used when enough sections are coupled together to cover the tire completely.

It is a well known fact that in the use of pneumatic tires, the tire is depressed at the point where it is in contact with the ground, forming a vacuum or suction at said point, and when the tire revolves the vacuum draws small particles of the road bed, such as gravel, stones or dust therefrom, eventually destroying the road. Furthermore, when traveling at any speed, the tire, by virtue of said suction, picks up the gravel and dust, causing great annoyance, not only to those in the vehicle, but to any one that might be behind the same. In constructing a tire protector that is composed of a series of hollow links, it is of course obvious that when the tire is compressed no vacuum can be formed at the depressed point, for the reason that the plates or metallic links are in contact with the ground, whereas the compressed portion of the tire has between it and the ground the portion of the links in contact with the ground and the inner side of the links, thereby leaving an opening between the tire and the ground, the opening being the opening in the links themselves. For this reason, the vacuum ordinarily formed is destroyed and the tire when equipped with the tire protector as above described will not pick up small particles constituting a portion of the road bed.

In the preferred form of construction, the plates 23 are of different sizes and as herein shown the plate 27 is slightly smaller than the plates 23, so as to bring the plates, particularly along the tread of the tires, together. This is done to prevent any crawling or circumferential movement of the plates relative to the tire and to also completely cover the tire surface so that it can not be punctured. Furthermore, to prevent the tire from being injured by a so-called rim cut or cracking, the tire rim plates are extended a considerable distance from the rim and have a swinging or pivotal engagement therewith. In case the tire becomes deflated or in a semi-inflated condition the portion of the tire 28 where it is the thinnest, will bear upon the flat bearing surface of the rim plates, and not upon the narrow edge of the rim. A further fact to be noted is that the openings in the links permit any gravel or dust picked up by the tire protector to sift through the openings and fall to the ground, therefore less dust is raised when traveling with the tire protector described, than when traveling without the same.

It is of course apparent that my device is not limited in its use to a construction wherein the clencher rim and clencher tire is employed, as it is perfectly obvious that the series of bands carrying the links might be secured to any rim in various ways, and therefore without confining myself to the particular means herein shown for securing the various links to the wheel rim and without confining myself to the particular construction herein of the links or bands and the means for securing various sections carrying the links, to each other, I claim:

1. A tire protector, consisting of a plurality of substantially square pieces of metal in flattened form, having their corners turned inward whereby hollow plates are formed, and slots formed along the turned ends forming adjacent openings in the adjoining plates, and means for securing a series of said hollow plates to the rim of a wheel or the like, substantially as described.

2. A tire protector, consisting of two or more rim members adapted to be secured to the rim of a wheel, and oppositely disposed on both sides thereof, a series of plates arranged in rows between said rim members transversely relative to a tire, each plate being hollow in cross section and having lateral openings in the ends adjacent the adjoining plates; and means passing through said adjacent openings for securing said plates together and to said rim members, substantially as described.

3. A tire protector, consisting of a series of rim members adapted to be secured to the rim of a wheel and oppositely disposed on both sides thereof, a series of plates arranged in rows between said rim members, transversely relative to a tire, lateral passages through said plates, a metallic band passing through the lateral passages in each row of plates, said band being secured at both ends to oppositely disposed rim members, and means for securing the sections of each rim member together, substantially as described.

4. In a tire protector, the combination of a wheel, a rim thereon, a tire on said rim, a series of rim members adapted to engage the edges of said rim on opposite sides thereof, a series of metallic plates hollow in cross section, covering said tire and arranged in rows transversely of said tire, and means for securing each row of hollow plates together and to said rim members, consisting of a metal band passing through said hollow plates, having their ends secured to said rim members, substantially as described.

5. A tire protector, consisting of a series of substantially square pieces of metal having their corners turned inward whereby hollow plates are formed, integral projections formed upon the faces of a plurality of said plates, slots along two of the turned ends of each plate forming adjacent openings in the adjacent plates, and means for securing a series of hollow plates to a tire, substantially as described.

WILLIAM GREEN.

Witnesses:
   FREDERICK C. GOODWIN,
   JAMES R. OFFIELD.